(12) United States Patent
Nagai et al.

(10) Patent No.: US 6,668,988 B2
(45) Date of Patent: Dec. 30, 2003

(54) BUFFERING MECHANISM

(75) Inventors: Shigekazu Nagai, Adachi-ku (JP); Akio Saitoh, Kawaguchi (JP); Hiroshi Yumiba, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/227,477

(22) Filed: Aug. 26, 2002

(65) Prior Publication Data
US 2003/0037629 A1 Feb. 27, 2003

(30) Foreign Application Priority Data
Aug. 27, 2001 (JP) ........................................ 2001-256435

(51) Int. Cl.[7] .............................. F01B 13/00; F16F 9/00
(52) U.S. Cl. ...................... 188/318; 188/322.22; 91/61; 92/136

(58) Field of Search ............................ 74/89.37; 91/61, 91/394–409; 92/136; 188/287, 317, 318, 322.22

(56) References Cited

U.S. PATENT DOCUMENTS

| 5,806,402 A | * | 9/1998 | Henry ............................. 91/61 |
| 6,116,139 A | * | 9/2000 | Yuda et al. ..................... 91/61 |
| 6,435,072 B2 | * | 8/2002 | Hirano et al. .................. 91/394 |

* cited by examiner

Primary Examiner—Christopher P. Schwartz
(74) Attorney, Agent, or Firm—Paul A. Guss

(57) ABSTRACT

A buffering mechanism comprises a block member which is installed detachably in an actuator body, a piston which compresses air in a compressing chamber when a movable element abuts against the piston, and a check valve and a variable throttle valve which are provided in a passage for communication between the compressing chamber and the outside of the actuator body and which adjust a flow rate of the air discharged to the outside.

10 Claims, 5 Drawing Sheets

BUFFERING MECHANISM

BACKGROUND OF THE INVENTION

1. Field of the Invention

The present invention relates to a buffering mechanism capable of properly absorbing shocks applied to a movable element of an actuator when the movable element arrives at a displacement end position.

2. Description of the Related Art

Actuators have been hitherto used, for example, to transport or position a workpiece. For example, in an air cylinder, the air in a cylinder chamber closed by a cylinder tube and a piston is compressed, for example, by a cushion ring or a cushion packing when the piston arrives at the displacement end position. The compressive force is adjusted by adjusting the flow rate of the air discharged from the cylinder chamber into the atmospheric air by means of a cushion valve composed of a flow rate control valve for performing a buffering function to absorb the shock applied to the piston.

However, when the buffering mechanism of the conventional technique is applied to an electric actuator in which a movable element is displaced linearly along an actuator body under the rotary driving action of a rotary driving source, it is impossible to use, for example, the cushion ring or the cushion packing. In the electric actuator, the air in an amount sufficient to perform the buffering function is not available.

Even if the cushion ring or the cushion packing is used, it is impossible to conveniently replace the cushion ring or the cushion packing when the durability is deteriorated due to the use for a long period of time.

SUMMARY OF THE INVENTION

A general object of the present invention is to provide a buffering mechanism which can be conveniently replaced and which is capable of properly performing the buffering function in a variety of actuators including, for example, electric actuators and fluid pressure-operated cylinders.

According to the present invention, a movable element of an actuator abuts against a displacement member when the movable element arrives at one or the other displacement end position. The displacement member is displaced together with the movable element, and thus the air in a compressing chamber is compressed. When the compressed air in the compressing chamber is discharged to the outside of an actuator body, the discharge flow rate of the compressed air is throttled by a discharge flow rate-adjusting member in a passage communicating with the outside of the actuator body. Therefore, the shock applied when the movable element arrives at the displacement end position is properly absorbed by the compressing action of the air in the compressing chamber pressed by the displacement member.

In this arrangement, for example, the displacement member and the discharge flow rate-adjusting member are provided in the block member, and the block member is detachably installed in the actuator body. Therefore, the buffering mechanism can be replaced conveniently.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
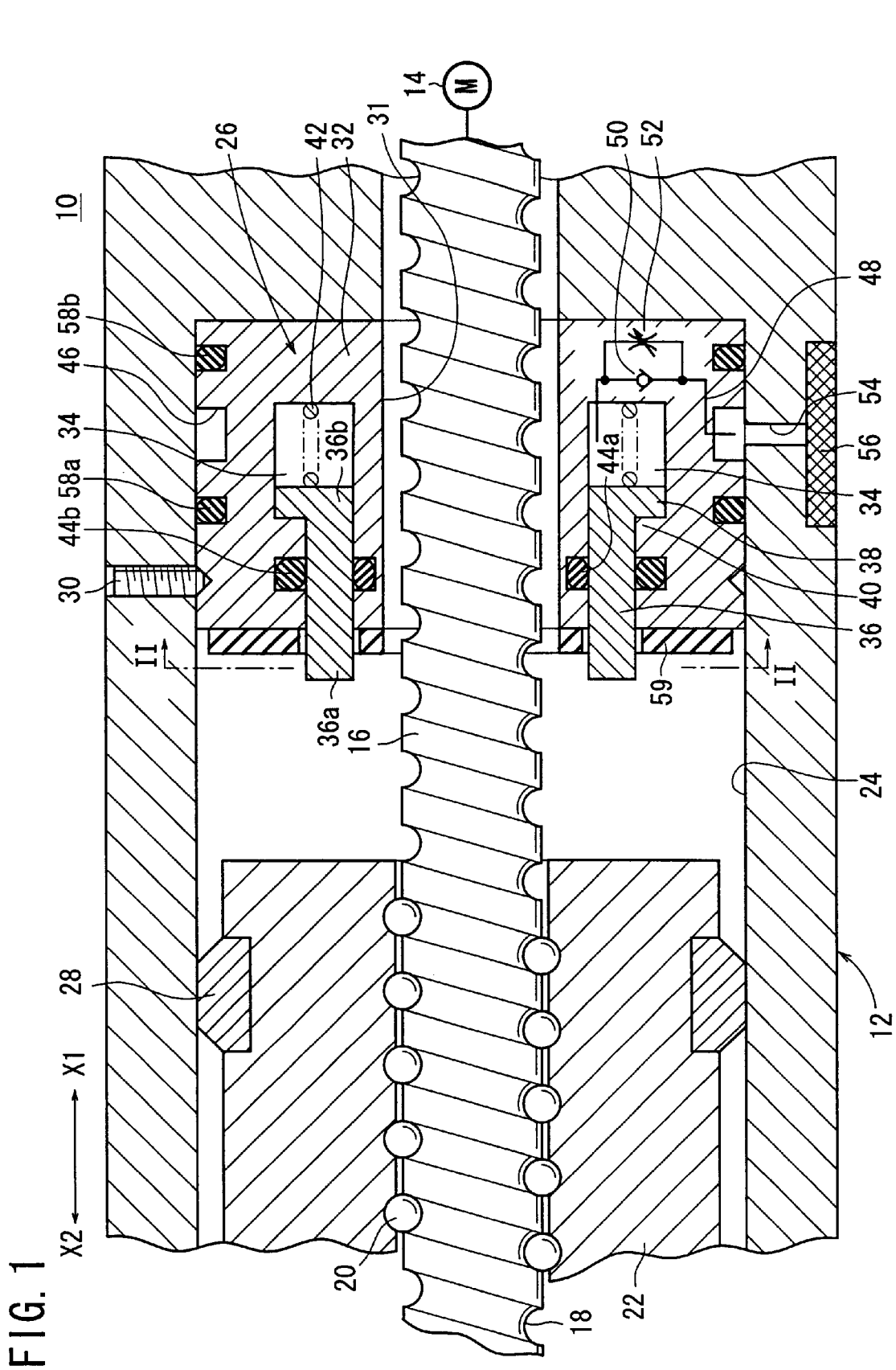
FIG. 1 is a longitudinal sectional view with partial omission illustrating an electric actuator to which a buffering mechanism according to an embodiment of the present invention is applied.

With reference to FIG. 1, reference numeral 10 indicates an electric actuator to which a buffering mechanism according to an embodiment of the present invention is applied.

The electric actuator 10 comprises an actuator body 12, a rotary driving source 14 such as a motor which is provided inside or outside of the actuator body 12, a ball screw shaft 16 which is connected to a drive shaft of the rotary driving source 14 by the aid of, for example, an unillustrated coupling member and which transmits the rotary driving force of the rotary driving source 14, a movable element 22 which is provided linearly displaceably in the axial direction of the actuator body 12 by the aid of balls 20 rolling along a screw groove 18 formed on the ball screw shaft 16, and a buffering mechanism 26 which is disposed detachably in a recess 24 of the actuator body 12.

The buffering mechanism 26 is provided at either one or the other displacement end position or at both of one and the other displacement end positions respectively in the recess 24 of the actuator body 12.

A guide member 28, which slides along an unillustrated guide groove formed on the inner wall surface of the actuator body 12, is installed to the movable element 22.

The buffering mechanism 26 is detachably disposed in the recess 24 of the actuator body 12 by the aid of a screw member (fastening member) 30 at the displacement end position of the movable element 22. The buffering mechanism 26 includes a block member 32 having a through-hole 31 for inserting the ball screw shaft 16 thereinto, and a ring-shaped piston (displacement member) 36 which is installed into an annular compressing chamber 34 in the block member 32 and which is provided displaceably substantially in parallel to the axial direction of the ball screw shaft 16.

One end 36a of the piston 36 is provided to protrude by a predetermined length from the end surface of the block member 32. An annular projection 38, which protrudes radially outwardly, is formed at the other end 36b of the piston 36. In this arrangement, the annular projection 38 abuts against an annular step 40 of the block member 32, and thus the disengagement of the piston 36 is prevented.

Figure 2:
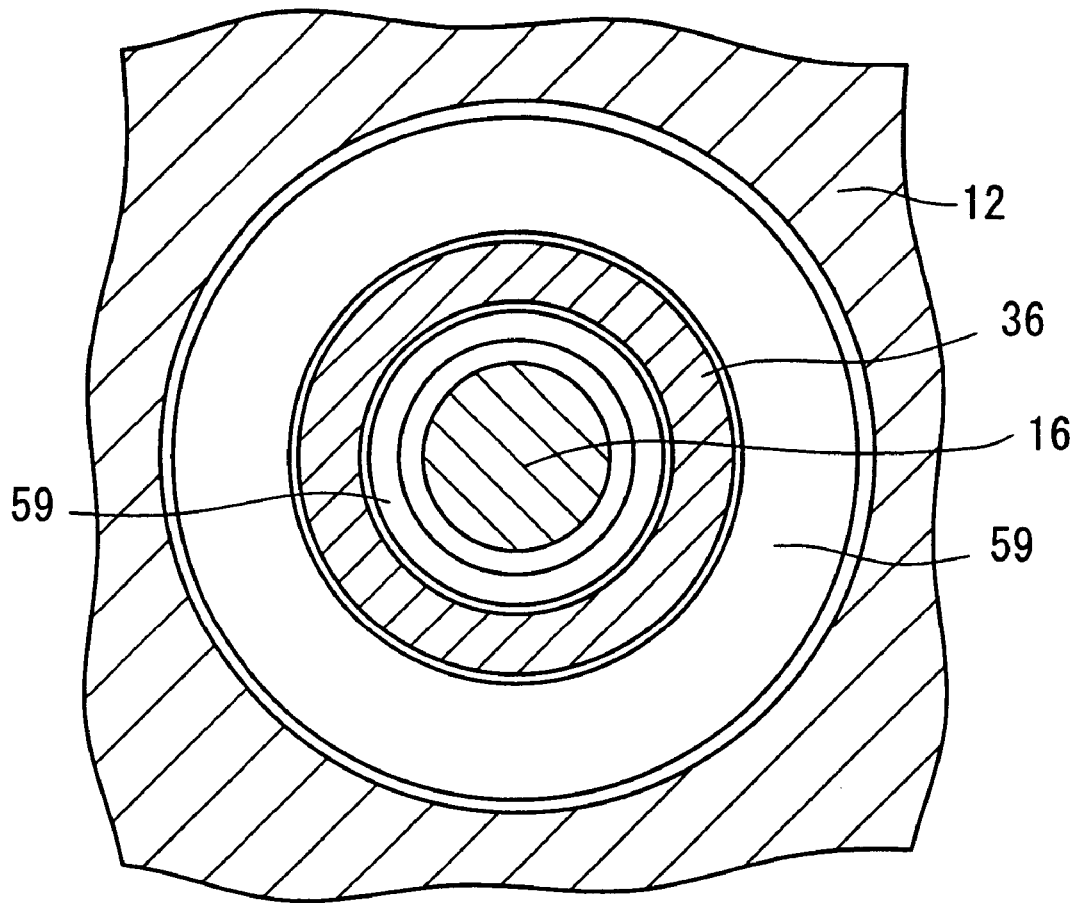
FIG. 2 is a vertical sectional view with partial omission taken along a line II—II shown in FIG. 1.
Figure 3:
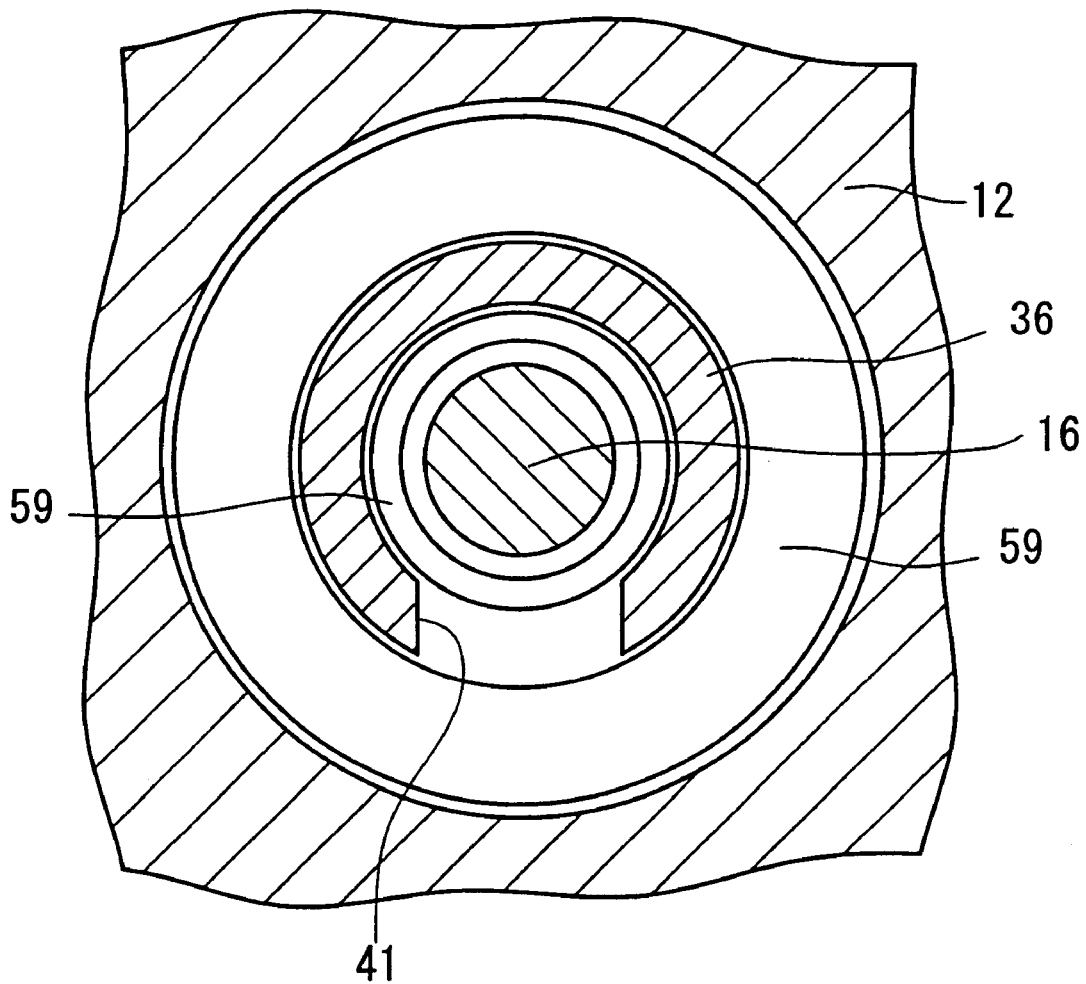
FIG. 3 is a vertical sectional view with partial omission illustrating a modified embodiment in which a piston shown in FIG. 2 has a slit.

The shape of the piston 36 may be substantially cylindrical as shown in FIG. 2. Alternatively, as shown in FIG. 3, a linear slit 41, which extends substantially in parallel to the axis of the ball screw shaft 16, may be formed. The slit 41 has a width slightly larger than the diameter of the ball screw shaft 16. The assembling operation of the buffering mechanism 26 is easily carried out by inserting the ball screw shaft 16 into the piston 36 through the slit 41.

The buffering mechanism 26 further comprises a spring member 42 which is disposed in the compressing chamber 34 and which constantly presses the piston 36 toward the movable element 22, and a pair of seal members 44a, 44b having small and large diameters which are installed to annular grooves formed on the block member 32 and which retain the air-tightness of the compressing chamber 34 by sealing the inner circumferential surface and the outer circumferential surface of the piston 36 respectively.

The buffering mechanism 26 further comprises a check valve 50 and a variable throttle valve 52 which are arranged substantially in parallel in a passage 48 for communication between the compressing chamber 34 in the block member 32 and an annular recess 46 formed on the outer circumferential surface of the block member 32, and a silencer 56 which absorbs the exhaust sound of the air discharged to the outside via a communicating passage 54 communicating with the annular recess 46. The air-tightness in the annular recess 46 is maintained by the aid of a pair of seal members 58a, 58b formed on the outer circumferential surface of the block member 32.

The check valve 50 stops the flow of air discharged from the compressing chamber 34 via the passage 48, and feeds air from the outside to the compressing chamber 34 via the passage 48. The check valve 50 and the variable throttle valve 52 function as the discharge flow rate-adjusting member.

An elastic member 59, which is formed of, for example, urethane rubber, is secured to the end surface of the block member 32 at which one end of the piston 36 protrudes.

The electric actuator 10, to which the buffering mechanism 26 according to the embodiment of the present invention is applied, is basically constructed as described above. Next, operation and effect of the electric actuator 10 will be explained.

The rotary driving source 14 is operated by energizing an unillustrated power source. The rotary driving force of the rotary driving source 14 is transmitted via the ball screw shaft 16 to the movable element 22. The movable element 22 linearly reciprocates in the axial direction of the actuator body 12 under the rolling action of the balls 20.

When the movable element 22 is displaced in the direction of the arrow X1 to arrive at the displacement end position, then the movable element 22 abuts against one end 36a of the piston 36, and the other end 36b of the piston 36 is displaced in the same direction (direction of the arrow X1) together with the movable element 22 against the spring force of the spring member 42.

When the other end 36b of the piston 36 is displaced in the direction of the arrow X1 along the compressing chamber 34, the air remaining in the compressing chamber 34 is discharged to the outside via the passage 48. The flow of the air is prevented by the check action of the check valve 50, and the flow amount of the air is regulated by the throttling action of the variable throttle valve 52.

Figure 4:
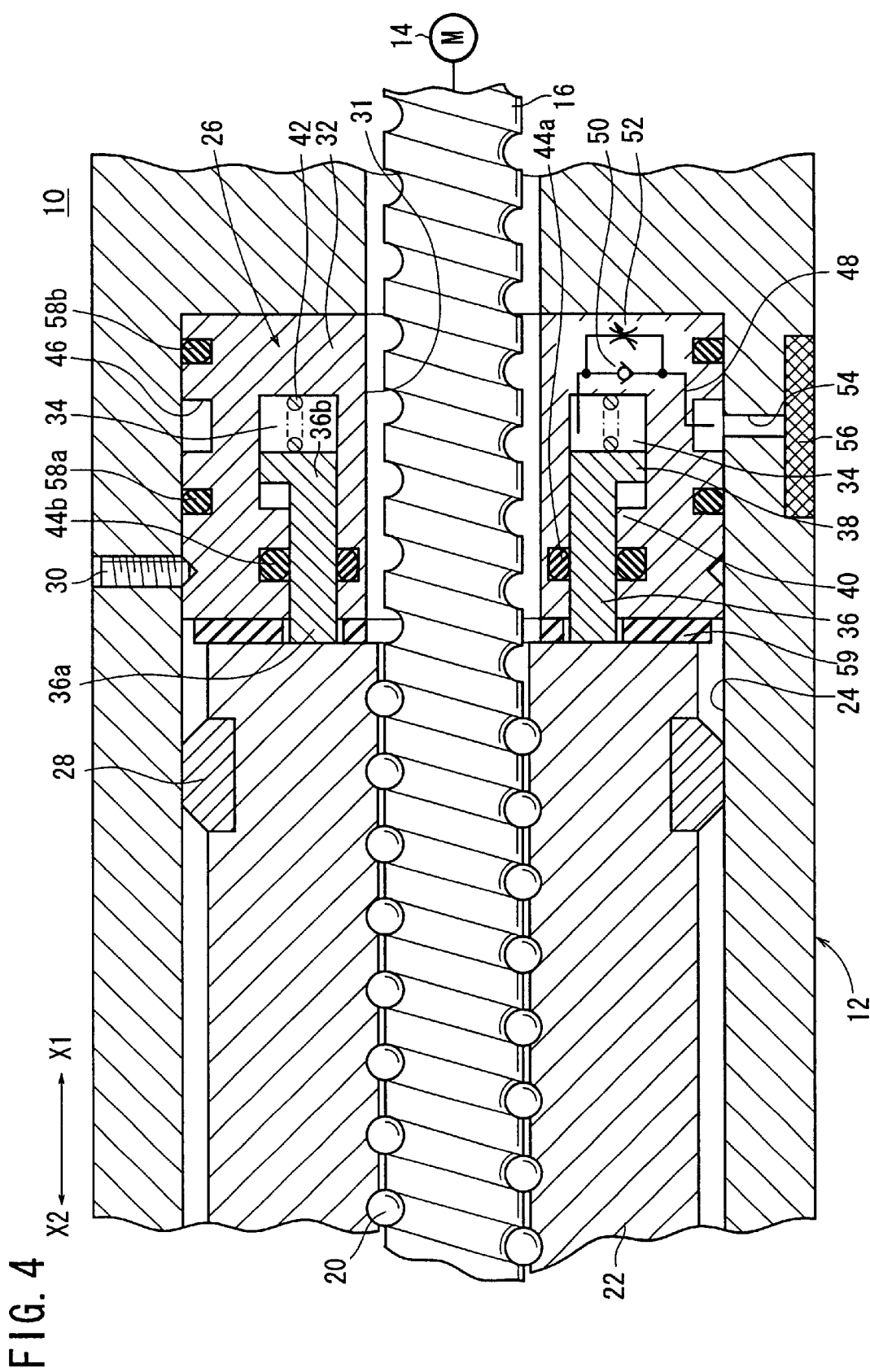
FIG. 4 is a longitudinal sectional view with partial omission illustrating a state in which a movable element of the electric actuator shown in FIG. 1 arrives at a displacement end position.

Therefore, the air remaining in the compressing chamber 34 is compressed to perform the buffering function. The shock, which is applied when the movable element 22 abuts against the block member 32, is properly absorbed by the cooperating action of the air and the elastic member 59 (see FIG. 4).

When the movable element 22 is displaced in the direction of the arrow X2 oppositely to the above, the other end 36b of the piston 36 is pressed in the direction of the arrow X2 by the spring force of the spring member 42. Accordingly, one end 36a of the piston 36 protrudes by the predetermined length from the end surface of the block member 32. The compressing chamber 34 is filled with the external air flowing through the check valve 50 to return to the initial state shown in FIG. 1.

In the embodiment of the present invention, the buffering mechanism 26 is formed as an assembly which is assembled with the block member 32, and the buffering mechanism 26 is detachably disposed in the recess 24 of the actuator body 12 by the aid of the screw member 30. Accordingly, the buffering mechanism 26 can be conveniently replacement. Therefore, it is possible to easily carry out, for example, the maintenance and the replacement when the durability is deteriorated.

Alternatively, the buffering mechanism 26 may be also applied to an electric actuator in which a movable element 22 linearly reciprocates using an unillustrated belt member in place of the ball screw shaft 16.

Further alternatively, the electric actuator 10 is also applicable, for example, to an electric actuator in which an unillustrated rod member moves back and forth from the end in the axial direction of an actuator body 12 by displacing a movable element 22, and an electric actuator in which an unillustrated slider is displaced in the axial direction of an actuator body together with a movable element by the aid of a slit formed on one side surface of the actuator body.

Figure 5:
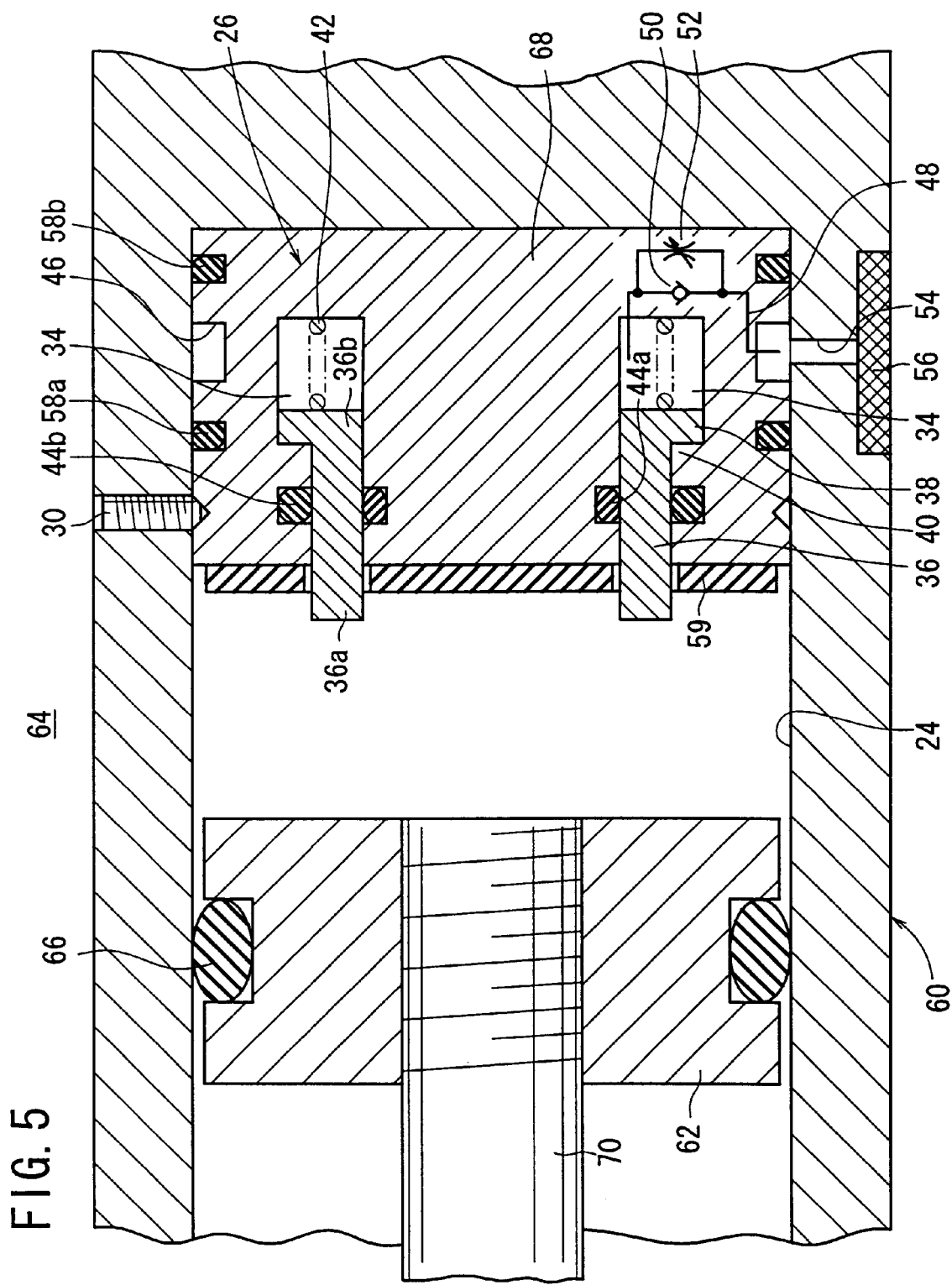
FIG. 5 is a longitudinal sectional view with partial omission illustrating a state in which the buffering mechanism shown in FIG. 1 is applied to a fluid pressure-operated cylinder.

Further alternatively, as shown in FIG. 5, the buffering mechanism 26 according to the embodiment of the present invention may be applied to a fluid pressure-operated cylinder 64 in which a movable element 62 is displaced along a cylinder tube 60. When the buffering mechanism 26 is applied to the fluid pressure-operated cylinder 64, it is possible to obtain a large buffering force, and the buffering mechanism 26 can be attached/detached conveniently by the aid of a screw member 30.

In FIG. 5, reference numeral 66 indicates a piston packing, reference numeral 68 indicates a block member, and reference numeral 70 indicates a rod member. The same constitutive components as those shown in FIG. 1 are designated by the same reference numerals, and detailed explanation thereof is omitted.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A buffering mechanism for absorbing shocks applied to a movable element of an actuator when said movable element arrives at a displacement end position, said buffering mechanism comprising:
   a block member which is installed detachably in an actuator body;
   a displacement member which is provided in said block member displaceably in a displacement direction of said movable element and which compresses air in a compressing chamber in said block member when said movable element abuts against said displacement member; and
   a discharge flow rate-adjusting member which is provided in a passage for communication between said compressing chamber and the outside of said actuator body and which adjusts a flow rate of said air discharged to the outside.

2. The buffering mechanism according to claim 1, wherein said discharge flow rate-adjusting member comprises a check valve and a variable throttle valve which are arranged in parallel in said passage.

3. The buffering mechanism according to claim 1, wherein a spring member, which presses said displacement member toward said movable element to return to an initial state, is disposed in said compressing chamber.

4. The buffering mechanism according to claim 2, wherein said check valve and said variable throttle valve are assembled to said block member, and said block member is installed detachably in said actuator body by the aid of a fastening member.

5. The buffering mechanism according to claim 3, wherein said displacement member and said spring member are assembled to said block member, and said block member is installed detachably in said actuator body by the aid of a fastening member.

6. The buffering mechanism according to claim 1, wherein said displacement member is composed of a cylindrical piston, and said piston has a linear slit extending in said displacement direction.

7. The buffering mechanism according to claim 1, wherein said displacement member is composed of a cylindrical piston, and said piston has one end protrudes by a predetermined length from an end surface of said block member.

8. The buffering mechanism according to claim 7, wherein an elastic member, which is composed of a rubber material, is installed to said end surface of said block member.

9. The buffering mechanism according to claim 1, wherein said actuator body has a silencer which absorbs exhaust sounds of said air discharged to the outside.

10. The buffering mechanism according to claim 1, wherein said actuator includes at least an electric actuator or a fluid pressure-operated cylinder.

\* \* \* \* \*